US009679048B2

(12) United States Patent
Chudnovskiy

(10) Patent No.: US 9,679,048 B2
(45) Date of Patent: Jun. 13, 2017

(54) CATEGORISATION SYSTEM

(71) Applicant: Majestic-12 Ltd, Birmingham (GB)

(72) Inventor: Alexey Chudnovskiy, Birmingham (GB)

(73) Assignee: MAJESTIC-12 LTD, Birmingham (GB)

( * ) Notice: Subject to any disclaimer, the term of this patent is extended or adjusted under 35 U.S.C. 154(b) by 107 days.

(21) Appl. No.: 14/555,017

(22) Filed: Nov. 26, 2014

(65) Prior Publication Data

US 2015/0310098 A1 Oct. 29, 2015

(30) Foreign Application Priority Data

Apr. 23, 2014 (GB) .................................. 1407150.0

(51) Int. Cl.

*G06F 17/30* (2006.01)
*G06F 21/57* (2013.01)
*H04L 29/06* (2006.01)

(52) U.S. Cl.

CPC .. *G06F 17/30705* (2013.01); *G06F 17/30619* (2013.01); *G06F 21/577* (2013.01); *H04L 63/1433* (2013.01); *H04L 63/1483* (2013.01)

(58) Field of Classification Search

CPC ................ G06F 17/30; G06F 17/3089; G06F 17/30861; G06F 17/30864; G06F 17/30867; H04L 14/585; H04L 63/14; H04L 63/1441; H04L 63/1483

USPC ............................. 726/1, 22, 23, 26, 27, 30

See application file for complete search history.

(56) References Cited

U.S. PATENT DOCUMENTS

2005/0198268 A1* 9/2005 Chandra ........... G06F 17/30864 709/224
2005/0251496 A1* 11/2005 DeCoste ........... G06F 17/30707
2006/0004716 A1 1/2006 Hurst-Hiller et al.
2008/0195631 A1* 8/2008 Dom ................. G06F 17/30873
2011/0010365 A1 1/2011 Garcia et al.
2013/0185802 A1* 7/2013 Tibeica ............... H04L 63/1483 726/26
2015/0026151 A1* 1/2015 Fujita ................ G06F 17/30958 707/708

OTHER PUBLICATIONS

European Search Report Issued in European Application No. 14195541.9, Oct. 5, 2015, 8 Pages.

* cited by examiner

*Primary Examiner* — Joseph P Hirl
*Assistant Examiner* — Kalish Bell
(74) *Attorney, Agent, or Firm* — Loeb & Loeb LLP

(57) ABSTRACT

A system for the categorization of interlinked information items, the system comprising: a trust flow module which is configured to receive a seed trust list of one or more first information items, the seed trust list associating the one or more first information items with one or more categories; and a trust flow module configured to: associate a respective trust value with each of the one or more categories for the one or more first information items; and iteratively pass at least part of the or each trust value to one or more further information items to generate, for each of the one or more further information items, at least one accumulated trust value associated with a category of the one or more categories, such that the one or more further information items can be categorized based on the at least one accumulated trust value and associated category.

23 Claims, 14 Drawing Sheets

CATEGORISATION SYSTEM

This application claims priority from GB1407150.0 filed on Apr. 23, 2014, entitled "A Categorisation System."

BACKGROUND OF THE INVENTION

Embodiments of the present invention relate to the categorisation of information items and the uses of such categorised information items.

There is a need to categorise information for various different purposes. For example, there is a need to categorise webpages and/or websites in order to refine search results from searches for information within a body of webpages and/or websites.

Other needs for the categorisation of information include, for example, the need to categorise e-mails and other sources of information which may be pushed to a user through a computer operated system (e-mail being just one example and others including social media services, and the like). The user may receive a large amount of information from a variety of sources in this manner. This information may include information in which the user has an interest but also information in which the user has no interest.

For example, it is common for a user to receive a variety of e-mail advertisements for various different shops and services. Some of which may be of interest but many of which are likely to be speculative and of no interest to the user.

Furthermore, the information may include malicious or illegitimate information items. These may, for example, be information items (e.g. e-mails) which direct the user to a particular webpage and attempt to trick the user into entering confidential or personal information (such as bank details and the like)—e.g. a so called Phishing attack. The operator of the webpage may then use that information to gain access to a secure service associated with the user (e.g. an online banking portal) through which the operator can then cause the user damage (e.g. transfer funds out of bank accounts etc). The information item could, for example, encourage the user to contact another person who will then engage the user in an attempt to cause the user damage (e.g. to convince them to transfer funds to them under false pretences). The information item could, on the other hand, provide a legitimate service but in relation to an illegal or disreputable product or service (e.g. the online sale of prescription medication or medication with approval, etc).

Many users would like to be able to filter information which is of no interest to them or which is potentially malicious, so that they are only presented with the information which is potentially of interest to them and/or not malicious in nature. As a result of this need, so called spam filters have been developed. These filters attempt to remove information which is potentially harmful or potentially of no interest to the user, from the information which is presented to the user. This reduces the risk of the user suffering damage as a result of malicious information items and reduces the volume of information items, so that the user can more easily see the information of interest.

The origin of some information may allow a system to categorise the information and to use the categories associated with the information to determine whether or not that information is of interest to a user and/or potentially malicious.

There is also a need for service operators to identify potential users of their services and to target those users with advertisements and the like. Clearly, if a service directs advertisements to users who are most likely to be interested in their service, then their advertisements become more effective. As a result, there is also a need to categorise users.

Current methods for categorising information are generally either computationally expensive or overly simplistic and are prone to error.

Embodiments of the present invention to seek to ameliorate one or more problems associated with the prior art.

SUMMARY OF THE INVENTION

An aspect of the present invention provides a system for the categorisation of interlinked information items, the system comprising: a trust flow module which is configured to receive a seed trust list of one or more first information items, the seed trust list associating the one or more first information items with one or more categories; and a trust flow module configured to: associate a respective trust value with each of the one or more categories for the one or more first information items; and iteratively pass at least part of the or each trust value to one or more further information items to generate, for each of the one or more further information items, at least one accumulated trust value associated with a category of the one or more categories, such that the one or more further information items can be categorised based on the at least one accumulated trust value and associated category.

The at least one accumulated trust value for a first of the one or more further information items may be generated by the combining of an accumulated trust value associated with the first further information item from an earlier iteration with at least part of a trust value or accumulated trust value associated with an information item of the one or more first information items or the one or more further information items which includes a link to the first further information item.

The trust flow module may be further configured such that an information item of the one or more first information items or the one or more further information items passes a total trust value or accumulated trust value which is a part of its own trust value or accumulated trust value dependent on a decay element.

The trust flow module may be further configured to split the trust value or accumulated trust value for an information item of the one or more first information items or the one or more further information items between a plurality of information items linked to that information item.

The trust flow module may be configured to convert the trust value associated with an information item of the first information items to an accumulated trust value and the information item is treated as a further information item.

The system may further comprise an indexing or mapping module which is configured to generate the index or map to the information items.

The system may further comprise a normalisation module configured to normalise the accumulated trust values for a plurality of information items.

The normalisation module may be configured to normalise the accumulated trust values according to an exponential distribution.

The system may further comprise an operation module which is configured to use the accumulated trust values to filter information to be presented to a user.

The operation module may be configured to identify one or more phishing attack emails using the accumulated trust values.

The operation module may be configured to identify one or more illegitimate advertisements using the accumulated trust values.

The operation module may be configured to identify one or more illegitimate websites or webpages using the accumulated trust values.

Another aspect provides a security system including: a system for the categorisation of interlinked information items, the system comprising: a trust flow module which is configured to receive a seed trust list of one or more first information items, the seed trust list associating the one or more first information items with one or more categories; a trust flow module configured to: associate a respective trust value with each of the one or more categories for the one or more first information items; and iteratively pass at least part of the or each trust value to one or more further information items to generate, for each of the one or more further information items, at least one accumulated trust value associated with a category of the one or more categories, such that the one or more further information items can be categorised based on the at least one accumulated trust value and associated category; and an operation module configured to: compare at least one of the at least one accumulated trust value and the associated category for one of the one or more first or further information items, with at least one of a respective value and category for another information item to identify a security threat.

The other information item may be a one of the one or more further information items or first information items.

The other information item may be an advertisement.

The other information item may be an e-mail.

The one of the information items and the other information item may both be webpages.

The system may be a spam filtering system.

The system may be configured to issue an alert on the identification of a security threat.

The system may be configured to inhibit or substantially prevent the display of the other information item to a user on identification of a security threat.

DESCRIPTION OF THE DRAWINGS

Embodiments of the present invention are described, by way of example only, with reference to the accompanying drawings, in which.

DESCRIPTION OF THE INVENTION

Embodiments of the present invention provide a method and system of categorising information. The method and system are typically described herein in relation to the categorisation of webpages and/or websites but it will be appreciated that the methods and systems could equally be used with other sources of information.

Figure 6:
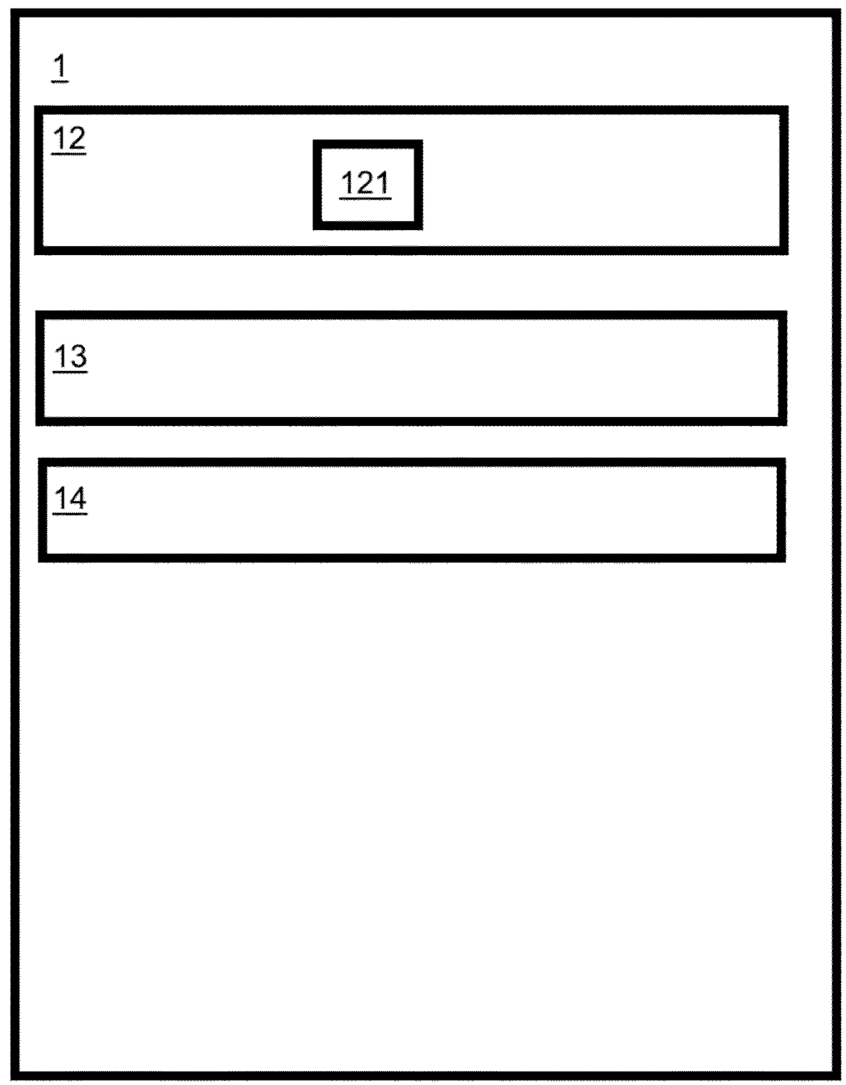
FIG. 6 shows a system of embodiments.

In accordance with some embodiments, a system 1 (see FIG. 6) is provided which is configured to categorise information.

Figure 1:
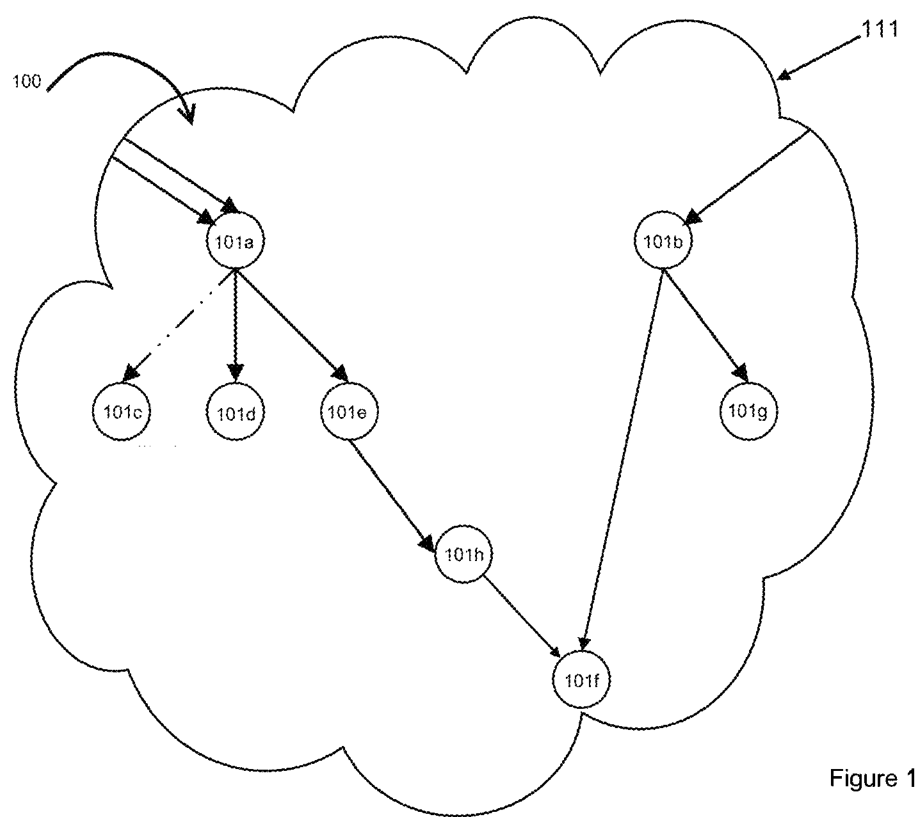
FIG. 1 shows a diagrammatic view of a body of information in the form of interlinked information items.

The information to be categorised is in the form of a body 100 of interlinked information items 101*a-h*. Such a body 100 of interlinked information items 101*a-h* is shown in FIG. 1 by way of example.

In some examples, the information items 101*a-h* each comprise respective webpages or websites 101*a-h*. Each webpage or website 101*a-h* is identifiable by an address (such as a URL) or other identifier. In some examples, the information items 101*a-h* include one or more devices. Such devices could, for example be identifiable by an Internet Protocol address or the like. Such devices may be part of a network of devices (e.g. the "Internet of Things"). As will be appreciated, teachings regarding embodiments which are described herein with reference to a webpage or website 101*a-h* could equally be applied to embodiments in which at least one of the webpages or websites 101*a-h* is a device.

A webpage or website 101*a-h* may link to another webpage or website 101*a-h* by use of the address or other identifier of the other webpage or website 101*a-h*. A browser software program 201 operating on a computer 200 may, for example, be configured to display (through a display 202 of the computer 200), or otherwise interpret, a first webpage or website 101*a-h* and to display (through the display 202), or otherwise interpret, a linked webpage or website 101*a-h* on the selection of an address or other identifier for the linked webpage or website 101*a-h* in the first webpage or website 101*a-h*.

Thus, for example, a webpage or website 101*a-h* may include one or more hyperlinks to one or more other webpages or websites 101*a-h*, as is conventional in the art.

Figure 11:
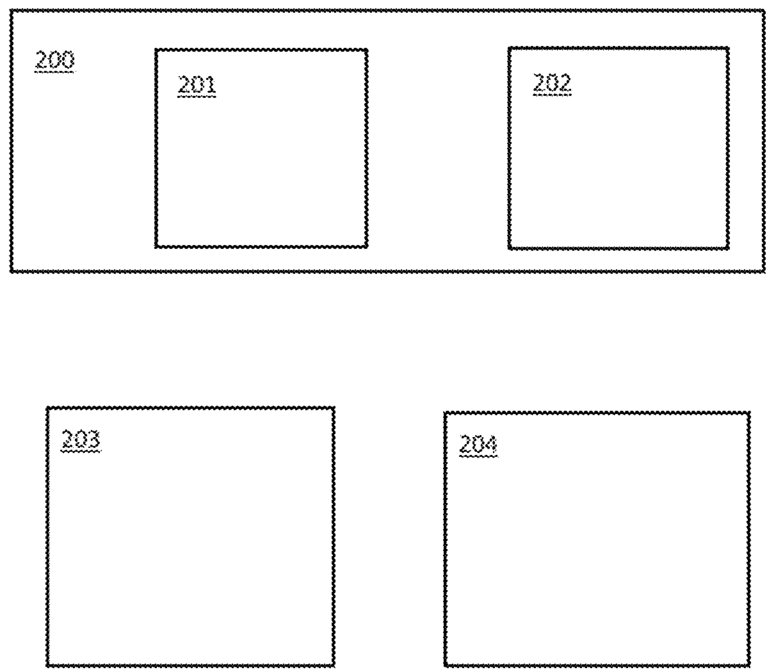
FIG. 11 shows a computer, server, and network of computing devices.

In some example embodiments, the webpages or websites 101*a-h* may be part of the World Wide Web and may, therefore, each comprise a hypertext document suitable to be interpreted and/or displayed by the browser software program 201 on the computer 200—see FIG. 11. The webpages or websites 101*a-h* may be distributed through a network 203 of computing devices (to which the computer 200 is connected), such as the Internet. The network 203 of computing devices may be a wide area network or a local area network. The network 203 may be an intranet associated with a particular organisation or service.

As will be appreciated, the network 203 of computing devices may connect devices such as the computer 200 and other similar computers, along with one or more servers 204. The webpages or websites 101*a-h* may be hosted by the one or more servers 204 or by other computing devices in the network 203 such that the computer 200 can access the hosted webpages or websites 101*a-h*. In other words, the body 100 of information is, in some embodiments, a distributed body 100 of information which is spread across a plurality of computing devices of the network 203.

In some example embodiments, the body 100 of information to be categorised is in a different form. For example, the body 100 of information may comprise interlinked information items 101*a-h* which are not distributed across a plurality of computing devices of the network 203. Indeed, in some embodiments, there may be no network 203. The body 100 of information may be accessible from a single computing device which may be the computer 200 or may be a computing device (such as a server) to which the computer 200 is connected. In other words, in some embodiments, the body 100 of information is a contained body 100 of information and may be a locally hosted body 100 of information. A contained body 100 of information is a body of information which is not distributed and a locally hosted body 100 of information is information which is accessible on the computer 200 without use of the network 203 (i.e. locally hosted by the computer 200).

In some embodiments, the body 100 of information comprises a mixture of two or more of: distributed, contained, and locally hosted information.

As described above in relation to webpages and websites, the interlinked information items 101*a-h* may be hypertext documents with the interlinking provided by the use of hyperlinks. This may also apply to interlinked information items 101*a-h* which are not webpages or websites. For example, locally hosted information forming the body 100 of information may include a plurality of hypertext documents 101*a-h* interlinked by one or more hyperlinks.

In some embodiments, the body 100 of information to be categorised may comprise interlinked information items 101*a-h* which include one or more references to other interlinked information items 101*a-h* of the body 100 but may not provide a link comparable to a hyperlink. For example, the body 100 of information may include a plurality of interlinked information items 101*a-h* in the form of scientific or other papers, wherein each paper includes one or more references to another paper in the body 100 of information. The reference may be by title, publication details, and/or author. In some embodiments, the papers may, in fact, be reference books (e.g. text books) or other written works.

Equally, in some embodiments, the body 100 of information may comprise a body of information items 101*a-h* which do not themselves include any interlinking. Instead, the interlinking of the information items 101*a-h* may be inferred by other information which is provided separately. For example, the body 100 of information could comprise the inventory of a library—each item in the library forming one of the information items 101*a-h*. The interlinking between the information items 101*a-h* may be provided not by the items themselves but by the borrowing history of one or more users of the library. In some example embodiments, the user's borrowing history may then form a virtual information item of the information items 101*a-h*.

In other similar examples, the body 100 of information may be the inventory of a shop or shopping service, or a list of the services offered by a service provider—each service or product forming an information item 101*a-h*. The interlinking may, again, be provided by purchase history for a user (which may become a virtual information item of the information items 101*a-h*).

A virtual information item may be treated in the same manner as any other information item 101*a-h* as described herein.

Clearly, the interlinking of information items 101*a-h* may be provided by other forms of information such as a browsing history of websites or webpages, etc.

In some embodiments, an indexing or mapping module 11 is provided as part of the system 1. The indexing or mapping module 11 may be configured to generate an index or map 111 of the interlinked information items 101*a-h* forming the body 100 of information to be categorised.

The generation of the index or map 111 may be achieved, for example, by the use of a crawler or spider (e.g. a Web crawler or Web spider) which systematically navigates through the interlinked information items 101*a-h* to generate an index or map 111 of the links between the information items 101*a-h*. It should be noted that a crawler may be provided with seed information items 101*a-h* which may well be different to the information items 101*a-h* which are listed in a seed trust list 121 which is described below.

The indexing or mapping module 11 may receive as an input one or more seed information items 112 from which the systematic navigation is to commence. As will be understood, the indexing or mapping module 11 may analyse the one or more seed information items 112 to identify one or more links to one or more other information items 101*a-h* of the body 100 of information. The indexing or mapping module 11 may then analyse the one or more linked information items 101*a-h* to identify further links, and so on. Of course, in some embodiments, not every link is to a new information item 101*a-h* and some of the links may be to an information item 101*a-h* which has already been analysed.

The indexing or mapping module 11 may be configured to operate in a similar manner in relation to other bodies 100 of information. For example, the indexing or mapping module 11 may be configured to step through interlinking information which is provided separately from the information items (such as a borrowing or purchase history as mentioned above). The indexing or mapping module 11 may be configured to analyse each interlinking information record in turn (or in parallel) and to generate an index or map 111 of information items 101*a-h*. Interlinking between two information items 101*a-h* in such examples may be provided by the presence of both information items in the interlinking information record (e.g. the borrowing or purchase history for a particular user). In some examples, the interlinking information record for a particular user becomes an information item 101*a-h*.

Each interlinking information record may then be linked to another interlinking information record through one or more common other information items 101*a-h*. In other words, each interlinking information record may be associated with the activity of a user (the borrowing or purchase history, for example). The indexing or mapping module 11 may, therefore, build links between records associated with users through the purchase or borrowing (for example) of the same item by each user. As will be appreciated, the indexing or mapping module 11 in such embodiments may generate an index or map 111 which includes orphan information items 101*a-h* which are linked to only a few other information items 101*a-h* or which are not linked to any other information items 101*a-h*. the indexing or mapping module 11 may be configured to split the index or map 111 into a plurality of indices or maps 111 such that each index or map 11 includes only information items which are linked to the other information items in that index or map 111 either directly or indirectly (i.e. without any orphan information items).

In some embodiments, the indexing or mapping module 11 is configured to receive a pre-generated index or map 111.

Each indexed or mapped information item 101*a-h* in an index or map 111 may be assigned one or more values representative of the popularity of the information item 101*a-h* (the values may be stored as part of the index or map 111 or may be stored separately therefrom). In other examples, the values are representative of a factor other than popularity or a factor which is merely representative of popularity.

For example, the value for a first information item 101*a* may be representative of the number of other information items 101*b-h* which include links to the first information item 101*a*. Of course, other measures of popularity may be used in some embodiments. The indexing or mapping module 11 may be configured to output the index or map 111 generated by this process to one or more other modules of embodiments of the system 1 of the invention.

The one or more values representative of popularity may be a trust value 123.

In some embodiments, a trust flow module 12 is provided. The trust flow module 12 is configured to use an index or map 111 of interlinked information items 101*a-h* (which may have been generated and output by the indexing or mapping module 11) along with the initial seed trust list 121 in order to allocate weighted topic categorisation values 122 to one or more of the interlinked information items 101*a-h*. The trust flow module 12 achieves this operation using an iterative trust flow method such as described herein.

Figure 7:
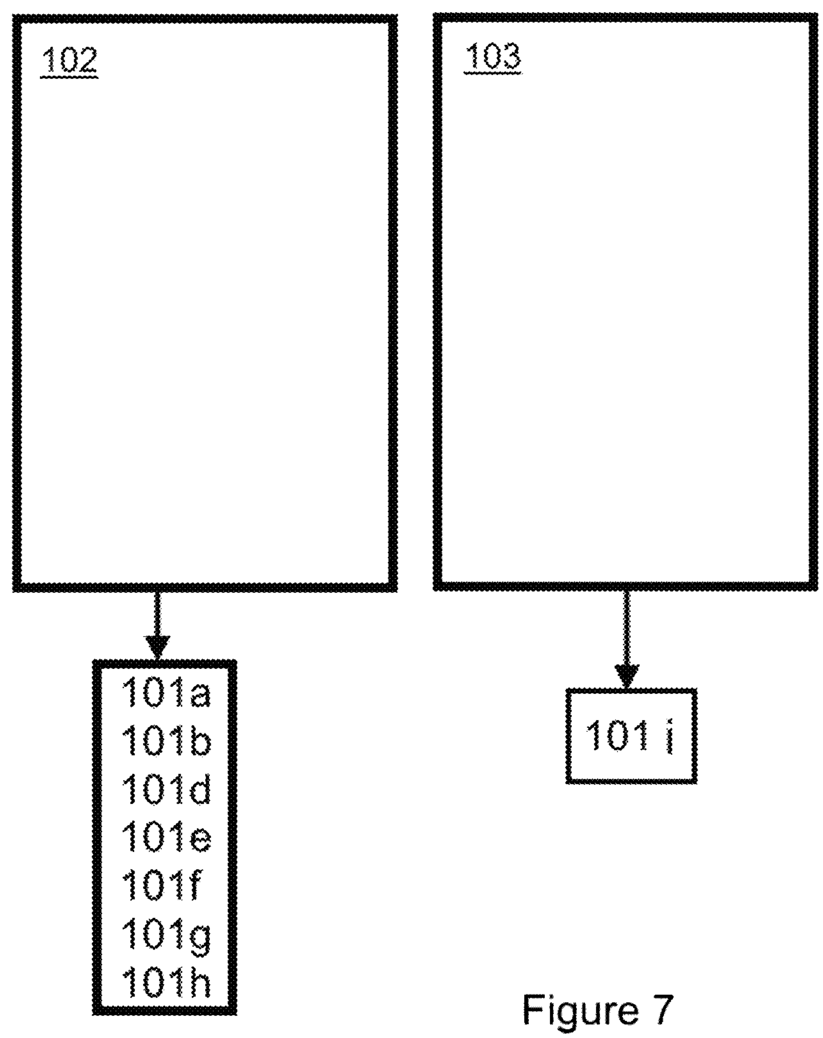
FIG. 7 shows the origin of certain information items.

The seed trust list 121 identifies a number of information items 101*a-h* which are pre-categorised. These information items 101*a-h* may, for example, come from popular or trusted sources 102—see FIG. 7. In this instance, a trusted source 102 may be a source which generates information items 101*a-h* of a verified category (i.e. which are unlikely to be an illegitimate source 103 generating information items 101*i* which appear to be of one category whilst, in fact, being generated for a different (sometimes malicious) purpose).

In some embodiments, the trusted source 102 may be a source which has been verified via other information provided by that source 102. Thus, for example, in the embodiments using purchase and borrowing histories, the trusted source may be a user who has verified their interests and/or study areas, or the like. This may be achieved by the user completing a questionnaire or the like, or may be achieved by the trust flow module 12 accessing one or more other records associated with the user—for example, a database listing the course(s) the user is taking at an educational institute. In examples using a questionnaire, this may be automatically presented to the user via a computing device associated with the user, the results from the questionnaire being provided to the trust flow module 12 which may or may not be remote from that computing device (the trust flow module 12 may be a computer program executed by the computing device or a remote computing device, for example).

Each information item 101*a-h* in the seed trust list 121 is associated with a category (or topic) which relates to the subject matter and/or source of the information item 101*a-h*.

Each information item 101*a-h* in the seed trust list 121 is also associated with a trust value 123. Each trust value 123 is an initial seed value allocated to and/or associated with a respective information item 101*a-h* (e.g. representative of a popularity of that information item 101*a-h*).

The trust value 123 may be provided in the seed trust list 121 or may be included in the index or map 111 generated by the indexing or mapping module 11.

The trust value 123 is indicative, in some embodiments, of the popularity of information item 101*a-h* associated with that particular trust value 123—this may be the value which is discussed above in relation to the indexing or mapping module 11, for example.

The trust flow method of the trust flow module 12 may begin by identifying the information items 101*a-h* in the seed trust list 121. The trust flow method may then associate the trust value 123 for those information items 101*a-h* with the category associated with each information item 101*a-h* to provide the weighted topic categorisation value(s) 122 for each information item 101*a-h*.

In some embodiments, one or more information items 101*a-h* from the seed trust list 121 may be associated with multiple categories. In which case, the trust value 123 may be equally assigned to each of the multiple categories or may be split between the multiple categories. The split may be an even split (or substantially even split) in some embodiments or may be a weighted split (depending on information about the categories for the information item 101*a-h*). Accordingly, each information item 101*a-h* may be associated with one more weighted topic categorisation values 122.

The trust values 123 (e.g. the weighted topic categorisation values 122) may be incorporated into the map or index 111 (or stored separately). This may, therefore, result in the map or index 111 of information items 101*a-h* in which some of the information items 101*a-h* are associated with at least one trust value 123 and each trust value 123 is associated with at least one category for the information item 101*a-h* (e.g. to form one or more weighted topic categorisation values for one or more of the information items 101*a-h* of the body 100 of information). These information items 101*a-h* will be referred to collectively as the first group of information items 101*a-h*. In the depiction of the index or map 111 in FIGS. 1-5 there are two "first information items" 101*a,b*.

The trust flow method then implements an iterative process.

In accordance with the iterative process, the trust values 123 (e.g. the weighted topic categorisation values 122) which are associated with each of the information items 101*a-h* of the first group of information items 101*a,b* pass to any information items 101*c-g* to which the first group of information items 101*a,b* include a link (e.g. the trust value 123 in the form of the weighted categorisation value 122 is passed to the daughter information item or items 101*c-g*, if any). These daughter information items 101*c-g* will be referred to collectively as the second group of information items 101*c-g*.

If one or more of the information items 101*a,b* of the first group of information items 101*a,b* includes no such links, then the trust value 123 (e.g. in the form of the weighted topic categorisation value 122) is not passed to any of the second group of information items 101*c-g*.

If one of the information items 101*a,b* of the first group of information items 101*a,b* is linked to only one information item 101*c-g* of the second group of information item 101*c-g*, then the trust value 123 (e.g. in the form of the weighted topic categorisation value 122) for that information item 101*a,b* of the first group of information items 101*a,b* passes to the linked information item 101*c-g* of the second group of information item 101*c-g* and that trust value 123 retains its association with the category with which it was associated in relation to that information item 101*a,b* of the first group of information items 101*a,b* (e.g. the trust value 123 in the form of the weighted topic categorisation value 122 is passed on and remains associated with the same topic categorisation). The linked information items 101*c-g* of the second and first groups of information items 101*a-g* are, accordingly, likely to be of the same or a similar category as each other.

The passing of the trust value 123 (e.g. as the weighted topic categorisation value(s) 122) from an information item 101*a,b* of the first group of information items 101*a,b* to the linked information item(s) of the second group of information items 101*c-g* may include a decay element. As such, the trust value 123 associated with a particular category (e.g. topic) in relation to the information item 101*a,b* of the first group of information items 101*a,b* may be marginally higher than the trust value associated with that category (e.g. topic) which passes to the linked information item 101*c-g* of the second group of information items 101_c-g_ (the difference being the result of the decay value or element).

If one of the information items 101_a,b_ of the first group of information items 101_a,b_ is linked to more than one information item 101_c-g_ of the second group of information items 101_c-g_, then the trust value 123 (e.g. in the form of the weighted topic categorisation value 122) of that information item of the first group of information items 101_a,b_ may be split between the linked information items 101_c-g_ of the second group of information items 101_c-g_. The split may be even, substantially even, or weighted. Again, the total of the split trust values 123 (e.g. one or more weighted topic categorisation values 122) may be marginally less than the trust value 123 (e.g. the corresponding weighted topic categorisation value 122) associated with the information item 101_a,b_ of the first group of information items 101_a,b_ and that marginal difference may be the result of the decay value or element.

When a trust value 123 (such as the weighted topic categorisation value(s) 122) passes from an information item 101_a,b_ of the first group of information items 101_a,b_ to an information item 101_c-g_ of the second group of information items 101_c-g_, the trust value 122 (e.g. weighted topic categorisation value 122) remains associated with that information item 101_a,b_ of the first group of information items 101_a,b_ but becomes an 'accumulated trust value'. Similarly, the trust value 123 (such as the weighted topic categorisation value(s)) which passes to an information item 101_c-g_ of the second group of information items 101_c-g_ also becomes an accumulated trust value 123 (which may still be in the form of weighted topic categorisation value(s) 122). This is explained in more detail below.

In accordance with the next step of the iterative process, the accumulated trust values 123 (e.g. in the form of weighted topic categorisation value(s) 122) associated with each of the first and second groups of information items 101_a-g_ then pass to their respective daughter information items 101_c-h_. Thus, for the information items 101_a,b_ of the first group of information items 101_a,b_, their accumulated trust values 123 (e.g. in the form of weighted topic categorisation value(s) 122) are passed, or split and passed, to the information items 101_c-g_ of the second group of information items 101_c-g_ in the same manner as described above in relation to the trust values 123 (e.g. weighted topic categorisation value(s) 122). The passed accumulated trust values 123 (e.g. weighted topic categorisation value(s) 122) are combined (e.g. by addition) with the accumulated trust values 123 (e.g. weighted topic categorisation value(s) 122) already associated with the information items 101_c-g_ of the second group of information items 101_c-g_.

For the second group of information items 101_c-g_, the accumulated trust values 123 (e.g. weighted topic categorisation value(s) 122), before further combining with accumulated trust values 123 within this same iterative step, are passed on to any information items 101_h_ to which the second group of information items 101_c-g_ include links.

These daughter information items 101_h_ are granddaughter information items 101_h_ of the first information items 101_a,b_, and will be referred to as the third group of information items 101_h_.

The passing on of the accumulated trust values 123 (e.g. weighted topic categorisation value(s) 122) to the third group of information items 101_h_ may be the same process as the passing of the trust values 123 from the first 101_a,b_ to the second 101_c-g_ groups of information items—with regard to splits, decay elements, and the like.

In the next iterative, the same process occurs again—this time in relation to the first, second, and third groups of information items 101_a-h_, as well as the daughter information items of the information items of the third group of information items 101_h_.

The process may then be repeated a number of times. In some embodiments, there are three or more iterative steps. In some embodiments, there are four, five, six, seven, eight, nine, ten or more iterative steps.

With each iterative step, the accumulated trust values 123 (e.g. weighted topic categorisation value(s) 122) for the information items 101_a-h_ increase. In addition, an information item 101_a-h_ may acquire separate accumulated trust values 123 for separate categories (e.g. one or more new weighted topic categorisation values 122 which it did not previously have). As will be appreciated, the web or body 100 of interlinked information items 101_a-h_ means that accumulated trust values 123 (e.g. weighted topic categorisation value(s) 122) may be added to through various different routes.

If an information item 101_a-h_ includes no links (i.e. no daughter information items 101_a-h_) then the trust value 123 or accumulated trust value 123 (e.g. weighted topic categorisation values 122) may not pass to that information item 101_a-h_ from its parent information item 101_a-h_ during any iteration of the process/method.

As discussed above, the trust value 123 (e.g. weighted topic categorisation value(s) 122) for each information item 101_a,b_ of the first group of information items 101_a,b_ becomes an accumulated trust value 123 (e.g. weighted topic categorisation value(s) 122). This is because those first group of information items 101_a,b_ may be daughter information items 101_a,b_ to other information items 101_a-h_. Therefore, during the iterative steps, the accumulated trust value 123 (or even the trust value 123 in some instances) (e.g. weighted topic categorisation value(s) 122) from other information items 101_a-h_ may pass to one or more of the information items 101_a,b_ of the first group of information items 101_a,b_—to be combined with the existing accumulated trust value 123 (e.g. weighted topic categorisation value(s) 122) for that information item 101_a,b_. Therefore, the value 123 (e.g. weighted topic categorisation value(s) 122) which each of the information items of the first group of information items 101_a,b_ passes on to its daughter information items 101_c-g_ may change over time. In addition, an information item of the first group of information items 101_a,b_ may acquire an accumulated trust value 123 (e.g. weighted topic categorisation value(s) 122) associated with a different category to its original category (with which the trust value 123 was associated).

After operation of the trust flow method by the trust flow module 12, the trust flow module 12 is configured to output the result as an index or map 111 of interlinked information items 101_a-h_ in which one or more of the information items 101_a-h_ is associated with a category and that category is associated with an accumulated trust value 123 (e.g. weighted topic categorisation value(s) 122) in respect of each information item 101_a-h_. In some embodiments, one or more of the information items 101_a-h_ may be associated with a plurality of categories and each category may be associated with a respective accumulated trust value 123 (e.g. weighted topic categorisation value(s) 122) for each respective information item 101_a-h_.

The interlinked information items 101_a-h_ may be viewed as an interconnected web of nodes 101_a-h_ with links from a first node 101_a-h_ to a second node 101_a-h_ being considered to be outgoing links of the first node 101*a-h* and incoming links for the second node 101*a-h*.

In some embodiments, an information item 101*a-h* may include several links to the same other information item 101*a-h*. Therefore, the method may consider unique links only.

The decay element ensures that some embodiments take into account a factor associated with the distance of one information item 101*a-h* to another (i.e. how many information items 101*a-h* are between two indirectly linked information items 101*a-h*). The decay element (or link decay) may be 0.85, for example—which means that 85% of the trust value 123 or accumulated trust value 123 (e.g. weighted topic categorisation value(s) 122) for a given information item 101*a-h* is passed to its daughter (101*a-h*) or to its daughters (101*a-h*) in total.

In embodiments in which the information items 101*a-h* may be webpages, websites, devices, or e-mails, the categories and associated accumulated trust values 123 (e.g. weighted topic categorisation value(s) 122) for the webpages/websites/devices/e-mails may be imparted onto the domains and subdomains of the webpages/devices/websites/e-mail addresses). The resulting index or map 111 generated by the trust flow module 12 may, therefore, include one or more categories and accumulated trust values 123 at different levels within an hierarchical representation of the interlinked information items 101*a-h*—e.g. at a domain level, at a subdomain level, and at a webpage/website/device/e-mail level. Thus, a domain may be associated with a potentially large number of categories (a blog hosting domain may be one such example). Each subdomain (which might be an individual blog in the example) may be associated with a sub-group of those categories. Each webpage (which might be an individual blog post in the example) may be associated with a sub-group of the sub-group of categories.

As will be appreciated, the index or map 111 generated by the trust flow module 12 may be a modified version of the index or map 111 provided to the trust flow module 12 by the indexing or mapping module 11.

An example implementation of the trust flow method is now discussed with reference to FIGS. 2-5.

In a first step of this example implementation (an "initial calculation step"), only information items 101*a-h* (such as webpages) in the seed trust list 121 are assigned a trust value 123. This may be performed by the indexing or mapping module 11 or may be a step which is performed by the trust flow module 12.

In the depicted example, there are two categories A and B (which may be topic categories). Category A is associated with a first information item 101*a* and Category B is associated with a second information item 101*b*—the first and second information items 101*a,b* having been listed in the seed trust list 121.

Each category A,B is associated with a trust value 123 and may be a weighted topic categorisation value 122. The trust value 123 for each category A,B may be determined based on the popularity of the information content 101*a,b*. For example, the information items 101*a,b* may be respective webpages/websites and the popularity may be based on the popularity of those webpages/websites based on the results of a web crawl (i.e. by determining the number of other webpages/websites which include links to those webpage/websites). This may be based on an assumption that the information items 101*a,b* listed in the seed trust list 121 will be linked to by genuine links (as opposed to links intended to bolster the apparent popularity of the information items 101*a,b* illegitimately). The number of links may be the number of unique links from other webpages, websites, domains, subdomains, and/or subnets.

In the depicted example, the trust values 123 assigned to each of the first and second information items 101*a,b* are four and one respectively. As discussed, each trust value 123 is associated with a category A,B and, thus, may be a respective weighted topic categorisation value 122. Of course, different trust values 123 may be assigned in other examples.

In the next step is termed the second step or the 'processing step' of the process. This processing step may, in some embodiments, also be the third, fourth, fifth, etc steps in the iterative process.

In this step, the trust values 123 assigned to the first and second information items 101*a,b* become respective accumulated trust values 123 of the first and second information items 101*a,b* (which may be considered to be nodes of the index or map 111).

In becoming an accumulated trust value 123, the actual value of the trust value 123 may not alter and may simply be re-termed the accumulated trust value 123. In other instances, the accumulated trust value 123 comprises the trust value 123 for that information item 101*a,b* plus at least a portion of the trust value 123 or accumulated trust value 123 for an information item which is linked to that information item 101*a,b*, as will become apparent.

In the processing step, the information items 101*c-g* which are linked to the first and second information items 101*a,b* acquire an accumulated trust value 123—which comprises at least a portion of one or more trust and/or accumulated trust values 123 of the first and/or second information item 101*a*,101*b*.

The accumulated trust value 123 for a particular information item 101*a-h* (such as a webpage/website/e-mail) may be determined according to the following:

nodes (i.e. information items 101*a-h*) with non-zero trust/accumulation values 123 that link out to other nodes will pass some of their trust or accumulated trust value 123 to those information items 101*a-h* such that the new accumulated trust value for a particular node (i.e. information item 101*a-h*) will be determined by:

(New accumulated trust value)=(Old accumulated trust value)+((Inherited accumulated trust value)*(Link decay))/(The number of outgoing links)

where:

(Inherited accumulated trust value) is the sum of all trust or accumulated trust values 123 either initially assigned or acquired from incoming links, possibly belonging to multiple topics (ie: 50% category A and 50% category B).

(Link decay) is a decay element, a value from 0 to 1 that is used to reduce amount of the trust or accumulated trust value 123 passed, to reduce amount of the values 123 passed on in each iteration (as the values 123 pass deeper into the body 100 of information (i.e. the web (index or map 111)) to reflect the diminishing relevance of the values 123 with distance from the original information item 101*a,b* to which the trust value 123 was assigned. For example, if the trust or accumulated trust values 123 act as recommendations, then those recommendations diminish in relevance with distance from the information content 101*a-h* in relation to which the recommendation was originally made (i.e. the information content 101*a-h* from the seed trust list 121). A recommendation to a closely linked information item 101*a-h* may, however, be more effective. In some examples, the (Link decay) is around 0.85. In some examples, the (Link decay) is greater than 0.5. In some examples, the (Link decay) is between 0.5 and 1. In some examples, the (Link decay) is between 0.7 and 0.9. In some examples, the (Link decay) is between 0.8 and 0.9.

(The number of outgoing links) is the number of unique links from a given information item 101*a-h.*

Some links can be chosen not to pass any accumulation/trust values 123.

Such links may be marked as 'nofollow' in the index or map 111 of the body 100 of information. A link may be marked as 'nofollow' if the link is identified as a low quality link. A low quality link may, for example, be a link which appears to be a deliberate attempt to manipulate one or more other systems (e.g. in the case of the world wide web, links between information items 101*a-h* may be used to manipulate search engine indexes). Low quality links may be links in certain types of information item 101*a-h*—such as a blog. Low quality links may be links which are deemed to be potentially spammy links. A low quality link may also be a link to another information item 101*c* which does not itself include any links to other information items 101*a-h* (i.e. a dead-end). For example, in the depicted index or map 111 shown in FIGS. 1-5, the link from the first information content 101*a* to the third information content item 101*c* has been marked as a 'nofollow' link.

In some embodiments, one or more links may be marked as 'nofollow' by the information item 101*a-h* which includes those one or more links or to which the one or more links link (i.e. in the parent or the target information item 101*a-h*). This may be included in metadata or annotations associated with the information item 101*a-h* and/or link(s).

Figure 2:
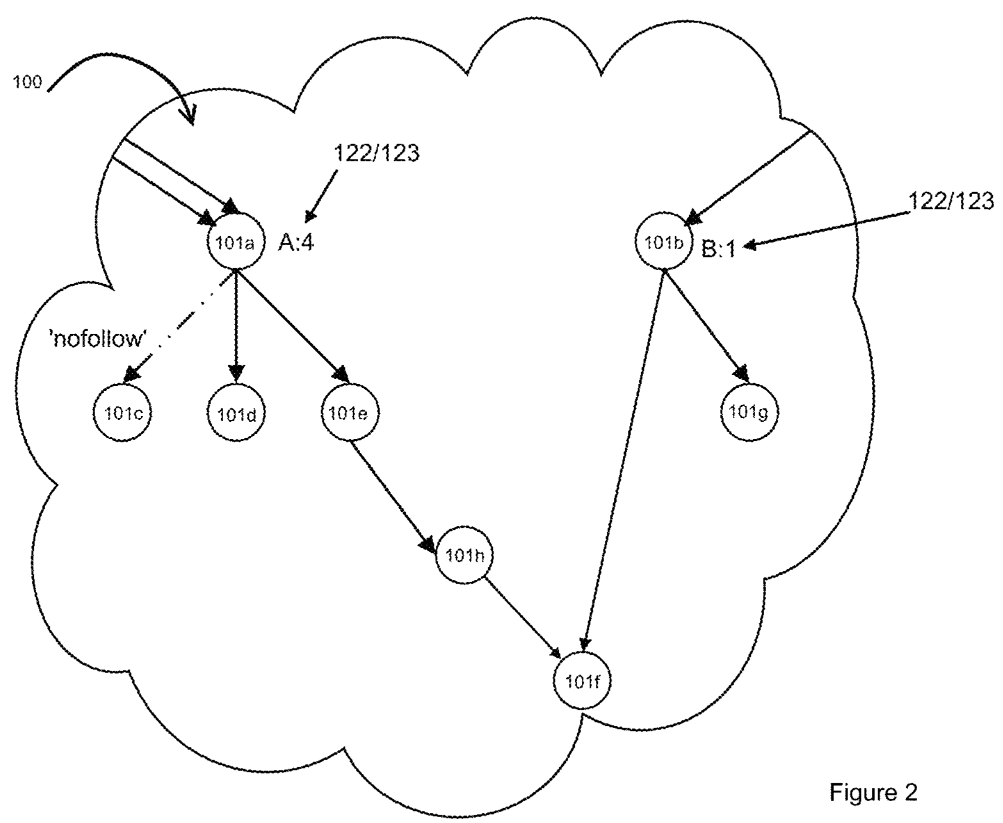
FIGS. 2-5 show the representation of FIG. 1 demonstrating examples of the steps which may be performed by the trust flow module.
Figure 3:
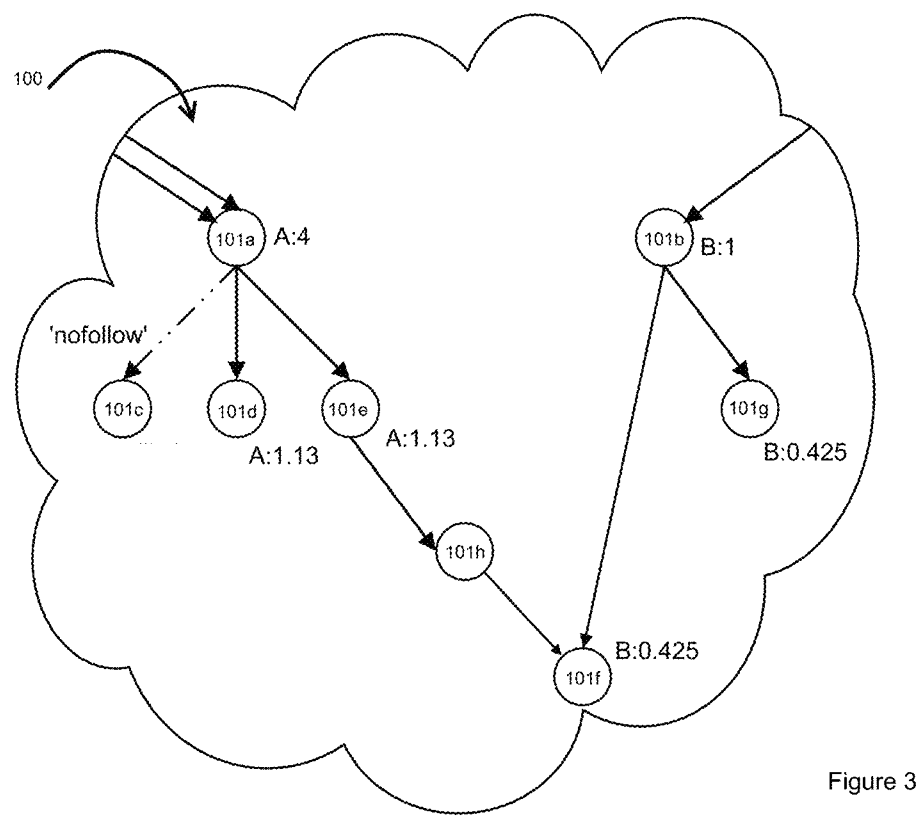

FIG. 3 shows the index or map 111 of FIG. 2 in which a further iteration of the second step.

As can be seen from this figure, a portion of the initial trust value 123 for the first information item 101*a* has been passed to fourth 101*d* and fifth 101*e* information items. The accumulated trust value 123 for each of the fourth and fifth information items 101*d,e* is:

$$0+((4*0.85)/3)=1.13$$

As can also be seen from this figure, a portion of the initial trust value 123 for the second information item 101*b* has been passed to sixth 101*f* and seventh 101*g* information items. The accumulated trust value 123 for each of the sixth and seventh information items 101*f,g* is:

$$0+((1*0.85)/2)=0.425$$

During this iteration, an eighth information item 101*h* was linked to only by another information item 101*e* (the fifth information item 101*e*) which did not yet have an accumulated trust value 123. Therefore, no accumulated trust value 123 was passed from the fifth to the eighth information item 101*h*.

Similarly, the eighth information item 101*h* includes a link to the sixth information item 101*f* but did not pass any accumulated trust value 123 to that information item 101*f* because it does not yet have an accumulated trust value 123 (i.e. it has an accumulated trust value 123 of zero).

Figure 4:
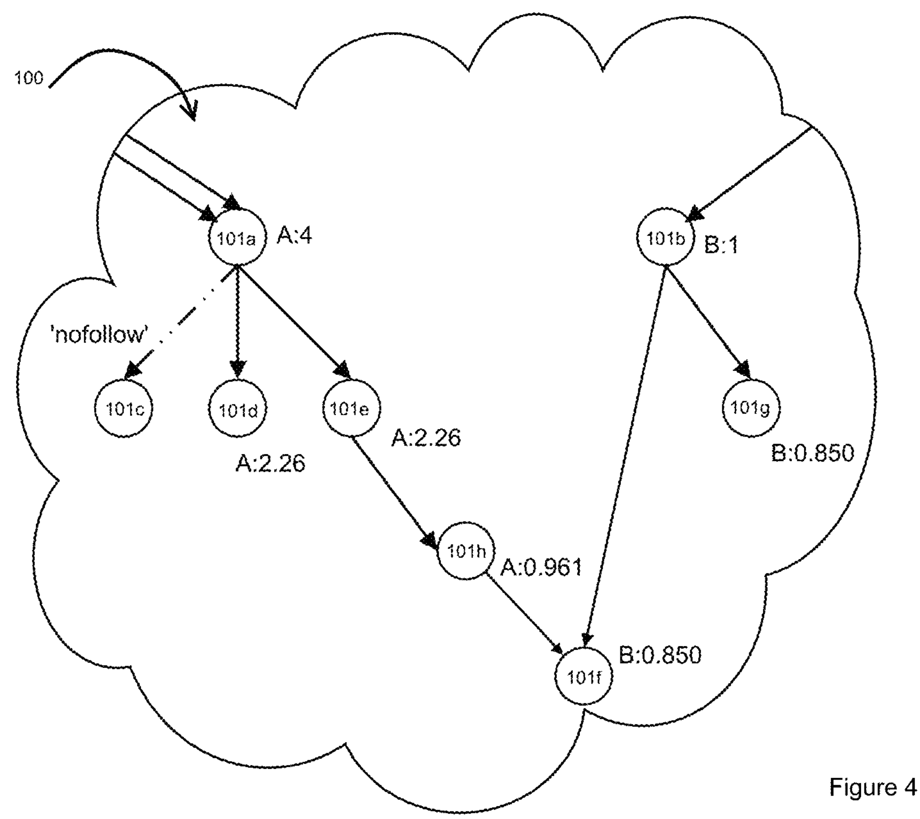

FIG. 4 shows the index or map 111 of FIG. 3 in which yet a further iteration of the second step.

As can be seen from this figure, a portion of the initial trust value 123 for the first information item 101*a* has been passed to fourth 101*d* and fifth 101*e* information items. The accumulated trust value 123 for each of the fourth and fifth information items 101*d,e* is:

$$1.13+((4*0.85)/3)=2.26$$

As can also be seen from this figure, a portion of the initial trust value 123 for the second information item 101*b* has been passed to sixth 101*f* and seventh 101*g* information items. The accumulated trust value 123 for each of the sixth and seventh information items 101*f,g* is:

$$0.425+((1*0.85)/2)=0.850$$

As can also be seen from this figure, a portion of the accumulated trust value 123 for the fifth information item 101*e* has been passed to eighth information item 101*h*. The accumulated trust value 123 for the eighth information items 101*h is:*

$$0+((1.13*0.85)/1)=0.961$$

Again, at the start of this processing step, the eighth information item 101*h* had no accumulated trust value 123 to pass to the sixth information item 101*f.*

At this stage, the accumulated trust values 123 for the first, fourth, fifth, and eighth information items 101*a,d,e,h* are all associated with Category A. Similarly, the accumulated trust values 123 for the sixth and seventh information items 101*f,g* are all associated with Category B. No one information item 101*a-h* is associated with more than one Category at this stage.

Figure 5:
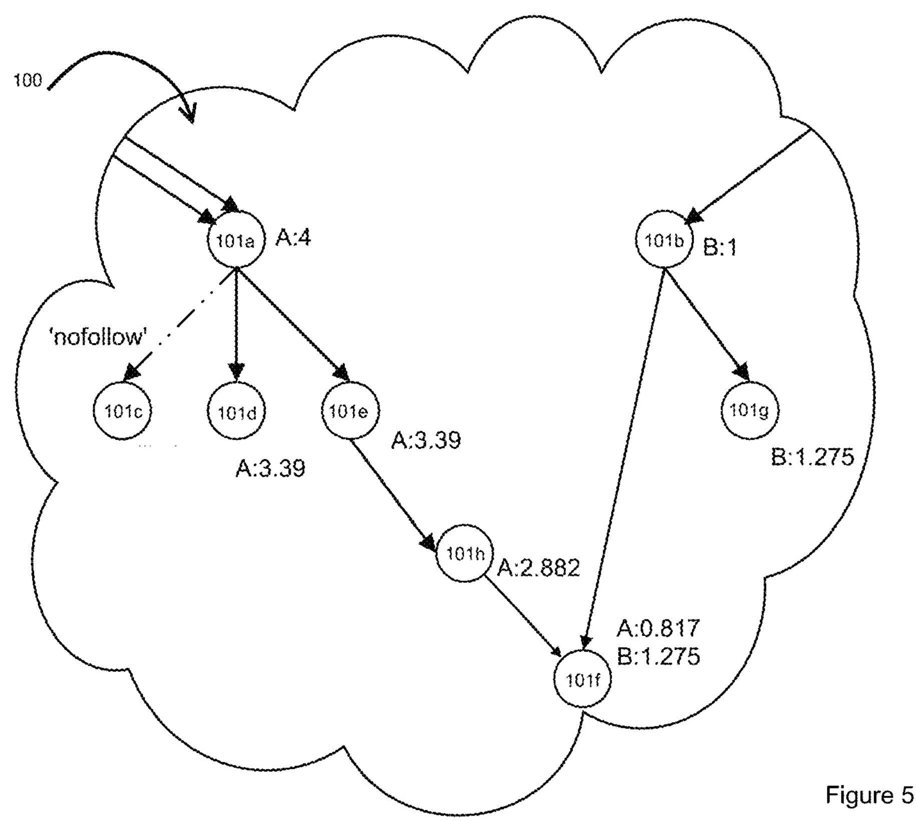

FIG. 5 shows the index or map 111 of FIG. 4 in which yet a further iteration of the second step.

As can be seen from this figure, a portion of the initial trust value 123 for the first information item 101*a* has been passed to fourth 101*d* and fifth 101*e* information items. The accumulated trust value 123 for each of the fourth and fifth information items 101*d,e* is:

$$2.26+((4*0.85)/3)=3.39$$

As can also be seen from this figure, a portion of the initial trust value 123 for the second information item 101*b* has been passed to seventh information item 101*g*. The accumulated trust value 123 for the seventh information item 101*g* is:

$$0.850+((1*0.85)/2)=1.275$$

As can also be seen from this figure, a portion of the accumulated trust value from the eighth information item 101*g* has been passed to the sixth information item 101*f.*

The sixth information item 101*f* now has accumulated trust values 123 for two different categories (A,B) which are determined as follows:

$$0.850+((1*0.85)/2)=1.275 \quad \text{Category B}$$

$$0+((0.961*0.85)/1)=0.817 \quad \text{Category A}$$

As can also be seen from this figure, a portion of the accumulated trust value 123 for the fifth information item 101*e* has been passed to eighth information item 101*h*. The accumulated trust value 123 for the eighth information items 101*h* is:

$$0.961+((2.26*0.85)/1)=2.882$$

At this stage, the accumulated trust values 123 for the first, fourth, fifth, and eighth information items 101*a,d,e,h* are all associated with Category A. Similarly, the accumulated trust values 123 for the seventh information item 101*g* is associated with Category B. However, the sixth information item 101*f* is associated with both Categories A and B, and has a separate accumulated trust value 123 associated with each category.

The link from the first information item 101*a* to the third information item 101*c* is marked as 'nofollow' and thus does not acquire an accumulated trust value 123.

The processing step is repeated iteratively for as many iterations as is determined to be necessary. In some embodiments, 6-7 iterations may be performed.

As has been seen in the above example, in each iteration of the processing step multiple accumulated trust values 123 may be maintained for each information item 101*a-h*, with each accumulated trust value 123 being associated with a category (which may be a topic category).

Omitted from the above example, for simplicity, were the links to the first and second information items 101*a,b* from other information items. As will be appreciated, as a result of these links, the accumulated trust values of the first and second information items 101*a,b* will not be the same as the initial trust values 123 for these information items 101*a,b*. Instead, the accumulated trust values 123 will likely increase with each iteration (and/or new accumulated trust values 123 may be associated with the information items 101*a,b* associated with other categories which may or may not be Categories A or B).

Embodiments of the present invention may also include a normalisation module 13. The normalisation module 13 is configured to normalise the accumulated trust values 123 associated with the or each information item 101*a-h*. This normalisation may be achieved in a number of different ways.

In accordance with embodiments, the accumulated trust values 123 are normalised to fit within a predetermined scale—e.g. a scale of values from 0 to 100 (or from 0 to 1000 or from 0 to 10, for example).

As will be appreciated, a high accumulated trust value 123 for an information item 101*a-h* implies that the information item 101*a-h* relates to the category (e.g. A or B) associated with that high accumulated trust value 123. The high accumulated trust value 123 also indicates that a relatively large number of other information items 101*a-h* include links to that information item 101*a-h* (as this has allowed a large accumulated trust value 123 to accumulate).

In many bodies 100 of information (such as webpages and/or websites and/or e-mails, and/or devices), there are likely to be a large number of information items 101*a-h* with relatively low accumulated trust values 123 and a small number of information items 101*a-h* with relatively high accumulated trust values 123.

For example, an information item 101*a-h* which is a website for a popular newspaper may be linked to by a large number of other information items 101*a-h* resulting in a high accumulated trust value 123 for that information item which is a website for a populate newspaper. An information item 101*a-h* which is a personal blog may be linked to by a low number of other information items 101*a-h* resulting in a low accumulated value 123.

However, an information item 101*a-h* which is a personal blog of someone who is considered to be influential may be linked to by a large number of information items 101*a-h* and, therefore, result in a high accumulated trust value 123.

Nevertheless, in general, the number of 'normal' personal blogs is likely to be far greater than the number of blogs from influential people and/or popular newspapers.

This expectation means that a graph which plots the number of information items 101*a-h* (y-axis) against the respective accumulated trust values 123 (x-axis) for those information items 101*a-h* is likely (in relation to many bodies 100 of information) to result in a curve representing a decay in the number of information items 101*a-h* as the accumulated trust values increase 123.

It has been found, however, that embodiments of the invention may generate a curve which is similar to a normal distribution curve. It has been found that normalising the results such that the expected decaying curve is achieved, results in an accurate and efficient categorisation of the information items 101*a-h* and the association of a useful weighting to the different categories which may be associated with any given information item 101*a-h*.

As will be appreciated, the accumulated trust values 123 for the various categories for the information items 101*a-h* represent the weightings of those categories for the information items 101*a-h*.

In some embodiments, the expected decay will be a generally exponential decay.

The normalisation module 13 may be configured to perform normalisation of the output from the trust flow module 12.

In some embodiments, therefore, the accumulated trust values 123 for the information items 101*a-h* may be grouped with high accumulated trust values 123 being assigned to groups by relatively narrow ranges of values 123 and low accumulated trust values 123 being assigned by relatively broad ranges of values 123.

The grouped accumulated trust values 123 may be given the normalised accumulated trust value 123 which is representative of the group. This may be done on a discrete basis (such that the accumulated trust values 123 each group are effectively rounded to a single value for that group) or on a substantially continuous basis (such that the normalised accumulated trust values 123 are based on, for example, the log of the actual accumulated trust values 123). This results, in some embodiments, in a generally exponential distribution of accumulated trust values 123—as would be expected in many instances.

These normalised accumulated trust values 123 can then be used to categorise the information items 101*a-h*. In other words, the normalised accumulated trust value or values 123 for an information item 101*a-h* represent weightings for the category or categories of the information item 101*a-h* and the perceived importance (or popularity) of the information item 101*a-h*. The relative accumulated (or normalised accumulated) trust values 123 for an information item 101*a-h* provides a category weighting and the magnitude of each of the accumulated (or normalised accumulated) trust values 123 represents the importance in the population of the information items 101*a-h* (i.e. in the body 100 of information).

In other words, the normalisation module 13 may be configured to use the accumulated trust values 123 for each information item 101*a-h*, as generated by the trust flow module 12, and to scale those accumulated trust values 123 to 0-100 levels. This may be done using any logarithmic function and re-arranging the accumulated trust values 123 to convert the data into an expected distribution of data (such as an exponential distribution).

Figure 9:
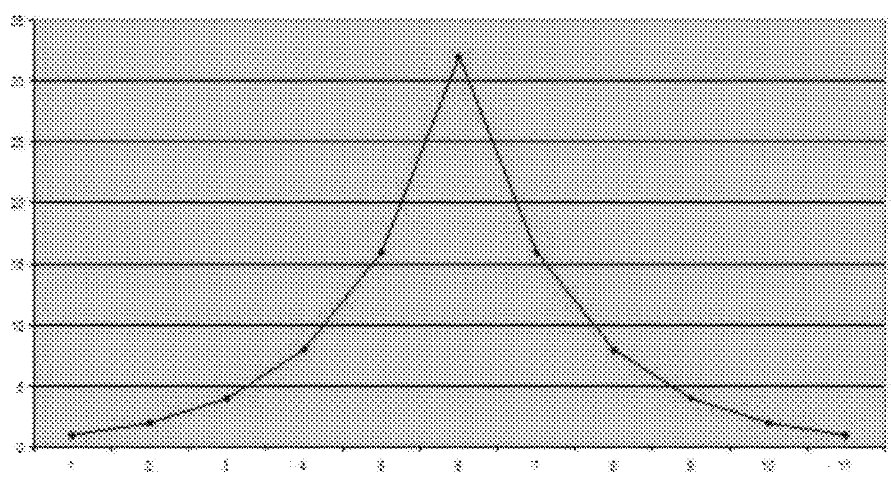
FIG. 9 shows a possible distribution of accumulated trust values.
Figure 10:
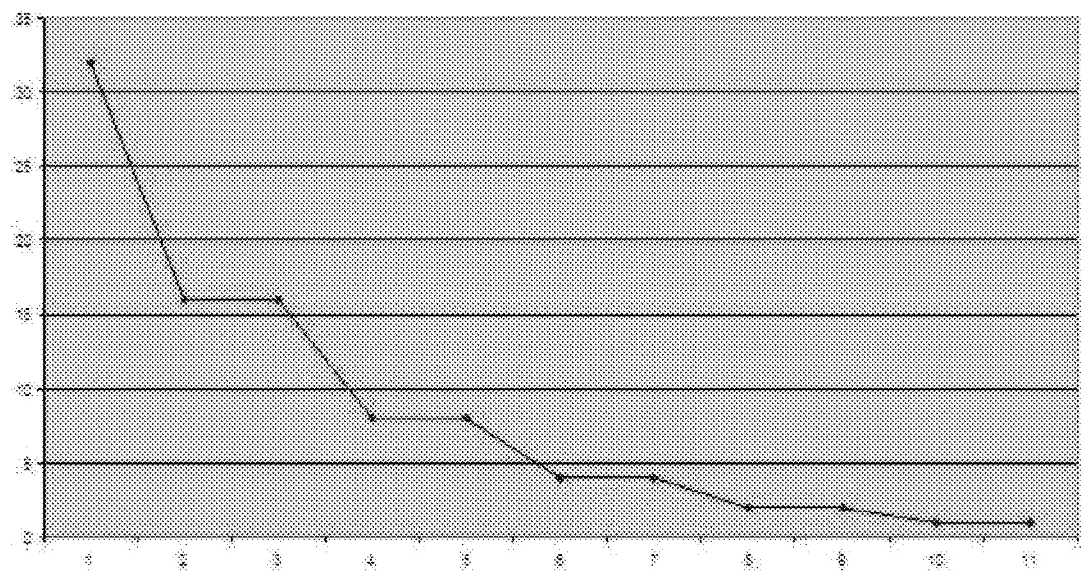
FIG. 10 shows a possible distribution of normalised accumulated trust values.

An example of a typical normal distribution of accumulated trust values 123 as may be generated by the trust flow module 12 can be seen in FIG. 9. An example of a normalised set of accumulated trust values 123 as may be generated by the normalisation module 13 can be seen in FIG. 10.

The normalisation module 13 may operate, in some embodiments, according to the following process/method:

1) Convert all the accumulated trust values 123 to logarithmic values rounded to the desired precision level (e.g. 3 decimal places) and count the number of information items 101*a-h* at each such precision level;

2) Calculate an exponent value, E, such that the distribution of information items 101*a-h* at the various precision levels will achieve a desired score scale (for example, a scale from 0-10 or 0-100) so that the distribution of accumulated trust values 123 changes from to a desired distribution (e.g. an exponential distribution).

In other words, the normalisation module 13 may, in embodiments, group accumulated trust values 123 based on a number of ranges of accumulated trust values 123. The ranges may vary in size in order to achieve the desired distribution (e.g. an exponential distribution). The accumulated trust values 123 in each range may then be normalised to a value within that range. This then provides normalised accumulated trust values 123 for the information items 101*a-h*, wherein each normalised accumulated trust value 123 is associated with a category.

The normalisation module 13 may perform the above method in relation to each category separately or may combine two or more categories (i.e. to achieve a combined desired distribution).

As will be appreciated, the normalisation module 13 is configured to output normalised accumulated values 13 in association with respective information items 101*a-h* and one or more categories. In some embodiments, this information may be output as an updated index or map 111.

Embodiments of the present invention include an operation module 14 which is configured to use the information output by the normalisation module 13 and possible operations of the operation module 14 are described below.

Embodiments of the present invention may be used to identify information items 101*a-h* (e.g. webpages or websites or e-mails, or devices etc) which are relevant to a particular category (which may be a particular topic). This information may then be used in, for example, the selection of advertisements to display on one or more of the webpages or websites, etc. Accordingly, the operation module 14 may be configured to receive a notification of an available advertising space for display on a website or webpage, etc. The operation module 14 may be configured to use the normalised accumulated values 123 to identify one or more categories associated with the website or webpage, etc. (these may be categories with a normalised accumulated value over a threshold value). The operation module 14 may be operable to access a set of possible advertisements which are also associated with one or more categories and to select one or more advertisements for display on the website or webpage, etc., based at least in part on a match or partial match between the one or more categories associated with the webpage or website, etc., and the one or more categories associated with the advertisement.

In some embodiments, the present invention may be used to categorise domains or subdomains and this may then be used to categorise one or more email addresses associated with those domains or subdomains. This may then be used to target advertising or the distribution of other information. For example, it may be understood that a business operates in a particular sector or has interests in a particular sector based on the categorisation of their website and/or webpages and/or blogs and/or e-mails. Advertisements relating to that sector may then be delivered to, for example, e-mail addresses using that domain or subdomain. The operation module 14 may be configured, therefore, to use receive a domain or subdomain for investigation, and to determine the category or categories associated with that domain or subdomain based on the normalised accumulated values 123 from the normalisation module 13 (the accumulated values 123 from the trust flow module 12). The operation module 14 may be further configured to select appropriate advertisements from a collection of advertisements, at least partially based on a correspondence or similarity between at least one category associated with the advertisement and at least one category associated with the domain or subdomain. The operation module 14 may then be configured to deliver that advertisement, e.g. via e-mail to one or more users associated with that domain or subdomain.

In some embodiments, the present invention may be used in a spam filter for an email system. Accordingly, the operation module 14 may be part of or linked to a spam filter. The spam filter may identify potential spam or unwanted e-mails and then use the categorisation of an associated domain or sub-domain (or linked information item within the email) to determine whether or not the recipient is likely to be interested in the email. The operation module 14 and/or spam filter may, therefore, be operable to compare one or more interest categories associated with the user with one or more categories associated with the domain or subdomain associated with the e-mail. The one or more categories associated with the user could, at least in part, be determined by embodiments of the present invention operating on one or more e-mails generated by the user—which are input into an embodiment as information items 101*a-h*, which may be linked to other information items 101*a-h* in the form of webpages or websites or emails, etc., from other users.

In some embodiments, the present invention may be used in refining search results. For example, the categorisation of webpages or websites that are returned by a conventional search engine in relation to a search term may be used to determine a likely topic of interest for that search term by the operation module 14 (which may use the category or categories associated with returned webpages or websites to identify a likely topic of interest). The search results for that search and/or a subsequent search may then be modified by the operation module 14 to promote search results relevant to that topic. This may include, for example, the exclusion of search results comprising webpages or websites which do not share the likely topic of interest for the search term entered by the user. Webpages/websites which do not include a categorisation could also be excluded from the results. This may help to exclude search results which are not legitimate results of interest—for example, a webpage/website in relation to which efforts have been made to promote illegitimately in search results.

In embodiments of the invention, the operation module 14 may be configured to associate one or more categories with one or more keywords or other information in the information items 101*a-h*. In other words, the operation module 14 may be configured to identify one or more nouns and/or verbs within an information item 101*a-h* and to associate the or each noun or verb with the category or categories associated with the information items 101*a-h*—as determined by the accumulated (or normalised accumulated) trust values 123. For example, one or more categories may be associated with an author's name or identifier. The importance (e.g. popularity) of that author may be determined by using the accumulated trust value 123 or normalised accumulated trust value 123. The operation module 14 be configured to output this information to provide, for example, the names (or other identifiers) of influential authors in a particular field. This could also be used to promote works by these authors in search results within the body 100 of information for works associated with that field (i.e. category).

In embodiments of the present invention, the operation module 14 is linked to or is part of a phishing email identification program. In such examples, the operation module 14 may compare or each category associated with an email address and/or domain and/or subdomain, with the or each category of a webpage and/or website to which the email includes links (both as determined using the normalised accumulated trust values or the accumulated trust values 123). A disparity between the categories would imply a potential phishing attack and the operation module 14 may output an alert accordingly. The operation module 14 could also compare one or more categories associated with the domain or subdomain with one or more keywords in an email. As such, the operation module 14 may be configured to determine a category for one or more keywords such that the operation module 14 is further operable to compare the or each category associated with the or each keyword with the or each category determined from the domain or subdomain (using the accumulated trust value 123 or normalised accumulated trust value 123). A disparity may indicated a phishing attack and cause the operation module 14 to issue an alert.

Embodiments of the present invention may also be used to determine potentially illegitimate advertisements. Most advertisers will use available systems for advertisements to be displayed to a user who is likely to be interested in the services or products being advertised. Accordingly, some advertisements are associated with particular search terms which may be entered into a search engine such that the advertisements are displayed when a search is performed using those terms. Operators of illegitimate websites or webpages may, however, attempt to place advertisements in relation to particular popular search terms in an effort to direct traffic to their website and/or webpage. In some embodiments, the operation module 14 may be configured to identify an advertisement for display in relation to a particular search query (for example) and to identify a webpage or website associated with that advertisement (e.g. a site or page to which the advertisement links or directs users). The operation module 14 may be configured to determine an association between a search term and one or more categories. The operation module 14 may be further configured to determine (using the accumulated trust values 123 or normalised accumulated trust values 123) one or more categories associated with the website and/or webpage associated with the advertisement. The operation module 14 may be configured to issue an alert if the categories do not correspond or are dissimilar—the alert identifying a potentially illegitimate advertisement. The operation module 14 may prevent the display of the advertisement to a user as a result.

The operation module 14 may be configured, in some embodiments, to analyse the accumulated trust values 123 and/or the normalised accumulated trust values 123 to determine one or more potentially illegitimate websites, webpages, domains, and/or subdomains. The operation module 14 may, for example, compare the category and accumulated (or normalised accumulated) trust value 123 profile with one or more predetermined profiles. For example, an illegitimate websites, webpages, domains, and/or subdomains may have a high accumulated trust value 123 (or normalised accumulated trust value 123) in relation to a large number of different categories, or may have a low accumulated trust value 123 (or normalised accumulated trust value 123) in relation to a large number of different categories. The one or more predetermined profiles may, therefore, be selected accordingly. Websites, webpages, domains, and/or subdomains having one or more of the predetermined profiles may then be flagged by the operation module 14 as potentially illegitimate websites, webpages, domains, and/or subdomains.

In some embodiments, the body 100 of information comprises press-releases and embodiments are configured to categorise the press-releases. The operation module 14 in such embodiments may be configured to distribute one or more of the press-releases to one or more users, domains, subdomains, e-mail addresses who/which have either been categorised (e.g. using an embodiment of the invention) or which have provided their own categories of interest—the distribution being based on common or similar categories.

In embodiments, the body 100 of information may comprise information including news items—which may include business and/or technology news items—and/or corporate or academic webpages/websites. The operation module 14 may be used to determine changes in the categorisations associated with this body 100 of information to identify trends. These trends may then be used to identify potential areas of future investment or research.

As will be understood, in embodiments of the present invention in which the operation module 14 is configured to identify potentially harmful or illegitimate activity and/or websites, webpages, domains, advertisements, devices, emails and/or subdomains, the operation module 14 may issue an alert in the form of a visual and/or audible alert to warn a user of the issue. In some embodiments, the operation module 14, may block access to or the display of the websites, webpages, advertisements, emails, devices, domains, and/or subdomains.

Embodiments of the invention may be used in any system in which the categorisation of interlinked information items may be useful.

Embodiments of the present invention may be implemented on a server which is coupled to the Internet. Embodiments of the present invention may include interfaces which are suitable to receive data (such as an index or map 111, etc).

In some embodiments, the indexing or mapping module 11 is implemented on a server, and/or the trust flow module 12 is implemented on a server (which may be the same or a different server) and/or the normalisation module 13 is implemented on a server (which may be the same or a different server). In some embodiments, the operation module 14 is implemented on a server (which may be the same or a different server) or may be implemented on a host computing device which may be a personal computing device—which is communicatively coupled to the trust flow module 12 and/or the normalisation module 13.

The operation module 14 may, in embodiments, implement one or more security operations—as will be appreciated from the above discussion.

Embodiments of the present invention may include a user interface which allows a user to navigate through one or more graphical representations of the results output by the or each module 11,12,13 of embodiments of the invention. The user interface may be interactive. For example, the user interface may be configured to display the whole or a part of a set of interlinked information items 101*a-h* and the categorisation information may be displayed by colouration of the nodes representing the information items. The user interface may be configured to show or hide nodes based on category or other information (such as geographical location).

The user interface may be configured to receive a user query in the form of a domain name, sub-domain name, website, or webpage (or an address thereof), and to provide an indication of the category or categories and the accumulated or normalised accumulated trust values 123 for each category associated with the user query. The user interface may allow, for example, a user to select a category from the indicated category or categories and, in return, may display information about how that categorisation was made—for example, an indication of one or more other information items 101*a-h* which caused that categorisation.

The user interface may be provided by the operation module 14.

Figure 8A:
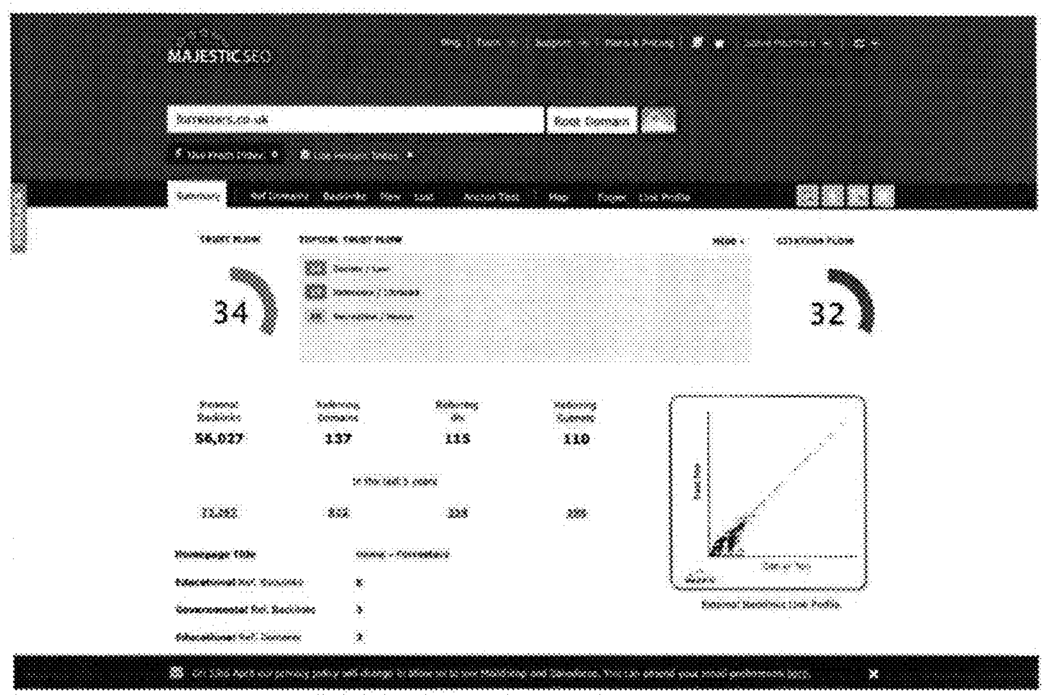
FIGS. 8*a*-8*d* show an example user interface.
Figure 8B:
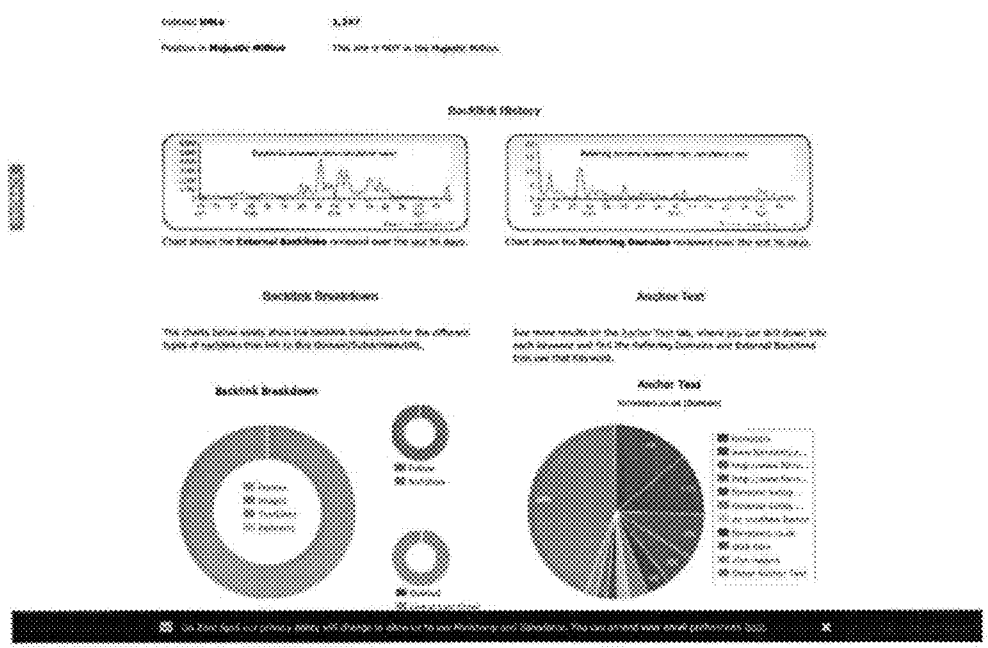
Figure 8C:
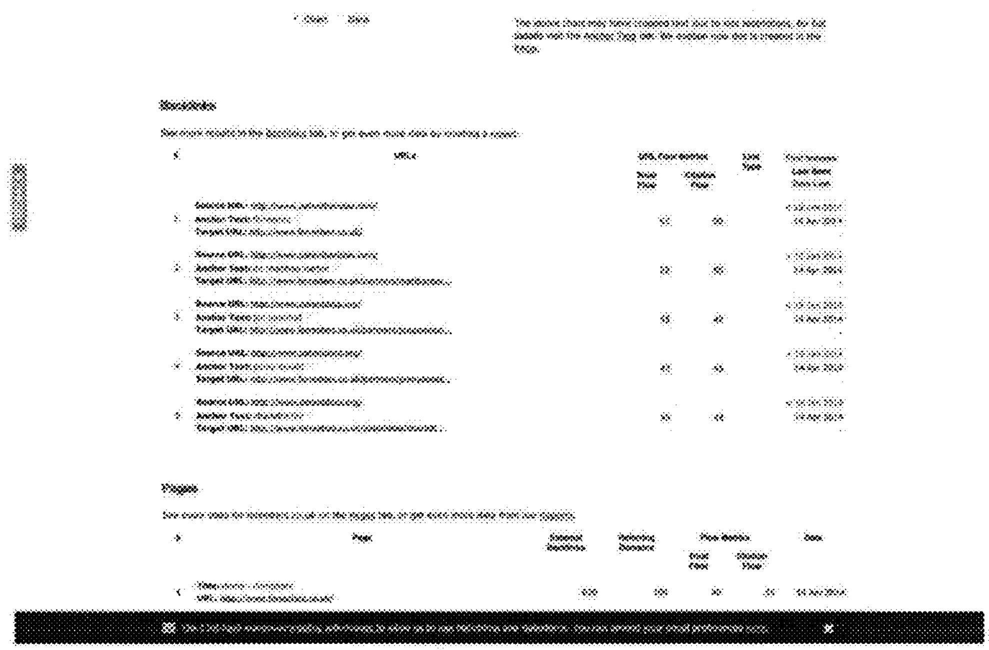
Figure 8D:
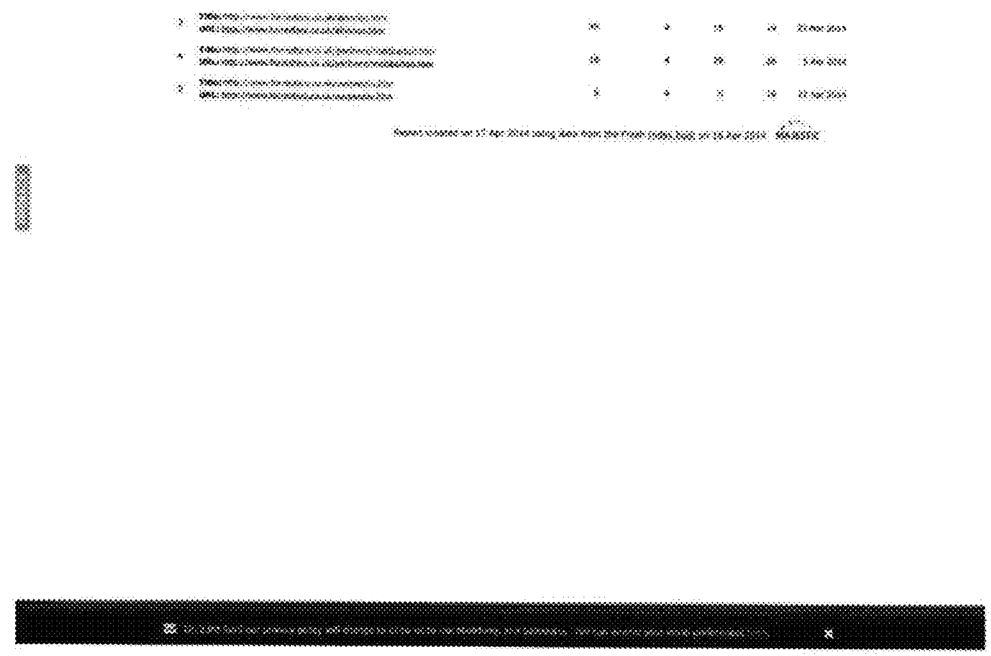

An example user interface can be seen in the FIGS. 8*a-c*. In the appended figures to the dark grey box under the title "Topical Trust Flow" shows the normalised accumulated trust values for various categories (which in this instance are topics).

The user interface, as can be seen in the examples, may include additional information, such as information regarding the number and type of links to and/or from that particular information item 101*a-h*.

The user interface may include other information—e.g. a title of the information item 101*a-h*, and historical records regarding the information item 101*a-h*.

Elements and aspects of the present invention have been described herein with reference to "modules". It will be appreciated that each module may comprise a computer program (i.e. a series of computer readable instructions which when executed by a computer cause the described function of the module to occur) and/or one or more hardware elements (such as, for example, programmable logic, network interfaces, and the like).

Embodiments of the present invention include the systems discussed herein, the modules (considered individually or in any combination), the methods discussed herein, a computer program to control the operation of such methods, and the like.

As will be appreciated, a trust value 123 which is associated with a particular topic is a weighted topic categorisation value 122. A trust value 123 is an initial seed value which becomes an accumulated trust value 123 during the first iteration of the trust flow method. Accordingly, therefore, the accumulated trust value 123 may comprise a weighted topic categorisation value 122 (where the accumulated trust value 123 is associated with a category representing a particular topic).

As will be understood, to determine if a particular information item 101*a-h* is associated with a particular category, embodiments may take all of the categories for which that information item 101*a-h* has an accumulated (or normalised accumulated) trust value 123 or may take only those categories for which the accumulated (or normalised accumulated) trust value 123 is above a predetermined threshold. In some embodiments, the threshold may be set by a user. In some embodiments, the above described use of a predetermined threshold is performed by the operation module 14.

In some embodiments, the information items 101*a-h* which are listed in the seed trust list 121 are first information items and the other information items 101*a-h* are further information items 101*a-h*. As will be appreciated, during and after the first performance of the processing step, the first information items 101*a,b* are not treated any differently to the further information items 101*a-h* and, therefore, may also be considered to be further information items 101*a-h*.

In several instances herein references are made to the use of the accumulated trust value 123. As will be appreciated, this may often be the normalised accumulated trust value 123 or the accumulated trust value 123 prior to normalisation. Equally, references to use of the normalised accumulated trust values 123 may be use of the accumulated trust value 123 prior to normalisation or to the normalised accumulated trust value 123.

As will be appreciated, embodiments of the present invention may be used to provide accumulated trust values 123 (or normalised accumulated trust values 123) for information items 101*a-h* which may include papers (e.g. academic or scientific), one or more products or services, one or more library items, etc.

As will also be appreciated, embodiments of the present invention may provide a more secure system for navigating through information items 101*a-h* (e.g. for navigating the World Wide Web). Embodiments may also improve search results and help with the provision of more targeted advertisements.

The index or map 111 may include one or more of a database, and a graphical representation.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A system for controlling the categorization and display of interlinked information items, the system comprising a processor and a memory, wherein the memory stores a set of machine-readable instructions operable, when executed by the processor, to:

receive a seed trust list of one or more first information items, the seed trust list associating the one or more first information items with one or more categories;

associate a respective trust value with each of the one or more categories for the one or more first information items; and iteratively pass at least part of the trust value or each trust value to one or more further information items to generate, for each of the one or more further information items, at least one accumulated trust value associated with a category of the one or more categories, and display the whole or part of the interlinked information items represented by nodes and to show or hide nodes based on the accumulated trust values associated with the category, compare at least one of the at least one accumulated trust value and the associated category for one of the one or more first or further information items, with at least one of a respective value and category for one or more respective daughter information items of the one or more further information items to identify a security threat; and issue an alert in the form of a visual or audible alert to warn a user on identification of the security threat, wherein iteratively passing at least part of the trust value or each trust value includes:

in a first step, passing at least part of the trust value or each trust value to the each further information item to generate the at least one accumulated trust value for each of the one or more further information items, and in a second step, passing at least part of the or each accumulated trust value to the one or more respective daughter information items of the one or more further information items and passing at least part of the or each trust value to the or each further information item to be combined with the respective at least one accumulated trust value, such that the one or more respective daughter information items of the one or more further information items can be categorized based on the at least one accumulated trust value and associated category.

2. The system according to claim 1, wherein the at least one accumulated trust value for a first of the one or more further information items is generated by the combining of an accumulated trust value associated with the first further information item from an earlier iteration with at least part of a trust value or accumulated trust value associated with an information item of the one or more first information items or the one or more further information items which includes a link to the first further information item.

3. The system according to claim 1, wherein the set of machine-readable instructions are further operable, when executed by a processor, such that an information item of the one or more first information items or the one or more further information items passes a total trust value or accumulated trust value which is a part of its own trust value or accumulated trust value dependent on a decay element.

4. The system according to claim 1, wherein the set of machine-readable instructions are further operable, when executed by a processor, to split the trust value or accumulated trust value for an information item of the one or more first information items or the one or more further information items between a plurality of information items linked to that information item.

5. The system according to claim 1, wherein the set of machine-readable instructions are further operable, when executed by a processor, to convert the trust value associated with an information item of the first information items to an accumulated trust value and the information item is treated as a further information item.

6. The system according to claim 1, wherein the set of machine-readable instructions are further operable, when executed by a processor, to generate the index or map to the information items.

7. The system according to claim 1, wherein the set of machine-readable instructions are further operable, when executed by a processor, to normalize the accumulated trust values for a plurality of information items.

8. The system according to claim 7, wherein normalizing the accumulated trust values includes normalizing the accumulated trust values according to an exponential distribution.

9. The system according to claim 1, wherein the set of machine-readable instructions are further operable, when executed by a processor, to use the accumulated trust values to filter information to be presented to a user.

10. The system according to claim 9, wherein the set of machine-readable instructions are further operable, when executed by a processor, to identify one or more phishing attack emails using the accumulated trust values.

11. The system according to claim 9, wherein the set of machine-readable instructions are further operable, when executed by a processor, to identify one or more illegitimate advertisements using the accumulated trust values.

12. The system according to claim 9, wherein the set of machine-readable instructions are further operable, when executed by a processor, to identify one or more illegitimate websites or webpages using the accumulated trust values.

13. A security system including:

a system for controlling the categorization and display of interlinked information items, the system comprising:

a processor and a memory, wherein the memory stores a set of machine-readable instructions operable, when executed by the processor, to:

receive a seed trust list of one or more first information items, the seed trust list associating the one or more first information items with one or more categories;

associate a respective trust value with each of the one or more categories for the one or more first information items;

iteratively pass at least part of the trust value or each trust value to one or more further information items to generate, for each of the one or more further information items, at least one accumulated trust value associated with a category of the one or more categories, such that the one or more further information items can be categorized based on the at least one accumulated trust value and associated category;

compare at least one of the at least one accumulated trust value and the associated category for one of the one or more first or further information items, with at least one of a respective value and category for one or more respective daughter information items of the one or more further information items to identify a security threat; and issue an alert in the form of a visual or audible alert to warn a user on identification of the security threat, wherein iteratively passing at least part of the trust value or each trust value includes:

in a first step, passing at least part of the trust value or each trust value to the or each further information item to generate the at least one accumulated trust value for each of the one or more further information items, and in a second step, passing at least part of the or each accumulated trust value to the one or more respective daughter information items of the one or more further information items and passing at least part of the trust value or each trust value to the or each further information item to be combined with the respective at least one accumulated trust value.

14. The system according to claim 13, wherein the another information item is a one of the one or more further information items or first information items.

15. The system according to claim 13, wherein the another information item is an advertisement.

16. The system according to claim 13, wherein the another information item is an e-mail.

17. The system according to claim 13, wherein the one of the information items and the another information item are both webpages.

18. The system according to claim 13, wherein the system is a spam filtering system.

19. The system according to claim 13, wherein the system is configured to issue an alert on the identification of a security threat.

20. The system according to claim 13, wherein the system is configured to inhibit or substantially prevent the display of the another information item to a user on identification of a security threat.

21. A system for controlling the categorization and display of interlinked information items, the system comprising:

a processor and a memory, wherein the memory stores a set of machine-readable instructions operable, when executed by the processor, to:

receive a seed trust list of one or more first information items, the seed trust list associating the one or more first information items with one or more categories;

associate a respective trust value with each of the one or more categories for the one or more first information items;

iteratively pass at least part of the or each trust value to one or more further information items to generate, for each of the one or more further information items, at least one accumulated trust value associated with a category of the one or more categories;

compare an accumulated trust value for one or more respective daughter information items of the further information items with a profile, to determine whether the one of the further information items is associated with an illegitimate website, webpage, domain or sub-domain;

flag the website, webpage, domain or sub-domain as illegitimate if the accumulated trust value has the profile; and issue an alert in the form of a visual or audible alert to warn a user when the accumulated trust value has the profile, wherein iteratively passing at least part of the or each trust value includes:

in a first step, passing at least part of the trust value or each trust value to the or each further information item to generate the at least one accumulated trust value for each of the one or more further information items, and in a second step, passing at least part of the or each accumulated trust value to the one or more respective daughter information items of the one or more further information items and passing at least part of the trust value or each trust value to the or each further information item to be combined with the respective at least one accumulated trust value, such that the one or more further information items can be categorized based on the at least one accumulated trust value and associated category.

22. A system for controlling the categorization and display of interlinked information items, the system comprising:

a processor and a memory, wherein the memory stores a set of machine-readable instructions operable, when executed by the processor, to:

receive a seed trust list of one or more first information items, the seed trust list associating the one or more first information items with one or more categories;

associate a respective trust value with each of the one or more categories for the one or more first information items;

iteratively pass at least part of the trust value or each trust value to one or more further information items to generate, for each of the one or more further information items, at least one accumulated trust value associated with a category of the one or more categories;

receive a user query in the form of a domain name, sub-domain name, website, webpage, or address of a webpage;

provide an indication of the category and associated accumulated trust value, associated with the user query;

receive a user selection of the category;

display information about how the categorization was made and show or hide nodes based on the accumulated trust values associated with the category;

compare at least one of the at least one accumulated trust value and the associated category for one or more respective daughter information items of the one or more first or further information items, with at least one of a respective value and category for another information item to identify a security threat; and issue an alert in the form of a visual or audible alert to warn a user on identification of the security threat, wherein iteratively passing at least part of the or each trust value includes:

in a first step, passing at least part of the or each trust value to the or each further information item to generate the at least one accumulated trust value for each of the one or more further information items, and in a second step, passing at least part of the or each accumulated trust value to the one or more respective daughter information items of the one or more further information items and passing at least part of the trust value or each trust value to the or each further information item to be combined with the respective at least one accumulated trust value, such that the one or more respective daughter information items of the one or more further information items can be categorized based on the at least one accumulated trust value and associated category.

23. A system for controlling the categorization and display of interlinked information items, the system comprising:

a processor and a memory, wherein the memory stores a set of machine-readable instructions operable, when executed by the processor, to:

receive a seed trust list of one or more first information items, the seed trust list associating the one or more first information items with one or more categories;

associate a respective trust value with each of the one or more categories for the one or more first information items;

iteratively pass at least part of the trust value or each trust value to one or more further information items to generate, for each of the one or more further information items, at least one accumulated trust value associated with a category of the one or more categories, such that the one or more further information items can be categorized based on the at least one accumulated trust value and associated category;

normalize the accumulated trust values for a plurality of information items according to an exponential distribution; and display the whole or part of the interlinked information items represented by nodes and to show or hide nodes based on the normalized accumulated trust values associated with the category;

compare at least one of the at least one accumulated trust value and the associated category for one or more respective daughter information items of the one or more first or further information items, with at least one of a respective value and category for another information item to identify a security threat; and issue an alert in the form of a visual or audible alert to warn a user on identification of the security threat.

* * * * *